(12) United States Patent
Hardcastle et al.

(10) Patent No.: US 7,147,384 B2
(45) Date of Patent: Dec. 12, 2006

(54) SMALL FORM FACTOR OPTICAL CONNECTOR WITH THERMOPLASTIC ADHESIVE

(75) Inventors: David S. Hardcastle, Liberty Hill, TX (US); Eric M. Morgan, Apex, NC (US); Edward B. Lurie, Round Rock, TX (US); Janet A. Kling, Manor, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 186 days.

(21) Appl. No.: 10/811,437

(22) Filed: Mar. 26, 2004

(65) Prior Publication Data

US 2005/0213891 A1  Sep. 29, 2005

(51) Int. Cl.
 *G02B 6/38* (2006.01)
(52) U.S. Cl. ............................. 385/60; 385/53; 385/56; 385/92
(58) Field of Classification Search .................. 385/60, 385/53, 56; 11/92, 94
See application file for complete search history.

(56) References Cited

U.S. PATENT DOCUMENTS

| 4,588,256 A |   | 5/1986 | Onstott et al. |
|---|---|---|---|
| 4,984,865 A | * | 1/1991 | Lee et al. ...................... 385/53 |
| 5,048,915 A |   | 9/1991 | Coutts et al. |
| 5,256,335 A | * | 10/1993 | Byrd et al. .................. 252/500 |
| 5,461,690 A |   | 10/1995 | Lampert |
| 5,481,634 A | * | 1/1996 | Anderson et al. .............. 385/76 |
| 5,543,474 A | * | 8/1996 | Kawaki et al. ............... 525/440 |
| 5,579,425 A |   | 11/1996 | Lampert et al. |
| 5,631,986 A |   | 5/1997 | Frey et al. |
| 5,638,474 A |   | 6/1997 | Lampert et al. |
| 5,647,043 A |   | 7/1997 | Anderson et al. |
| 5,719,977 A | * | 2/1998 | Lampert et al. ............... 385/60 |
| 6,318,903 B1 |   | 11/2001 | Andrews et al. |
| 2001/0033478 A1 | * | 10/2001 | Ortiz et al. .................. 361/818 |
| 2004/0190841 A1 | * | 9/2004 | Anderson et al. ............ 385/100 |
| 2005/0030698 A1 | * | 2/2005 | Krulevitch et al. ....... 361/301.4 |

FOREIGN PATENT DOCUMENTS

| EP | 0 967 497 A1 | 12/1999 |
| JP | 01210908 | 8/1989 |

OTHER PUBLICATIONS

Krone: "LC Connector Kits New Generation Connection Technology" [Online]; Aug. 2001 [Retrieved from the Internet Jun. 21, 2006]; URL <www.krone.com.au>pp. 4.
Quadrant: "PEI 1000 Product Data Sheet" [Online]; 2003 [Retrieved from the Internet Jun. 21, 2006]; URL <www.quadrantplastics.com>; p. 1.

* cited by examiner

*Primary Examiner*—Kaveh Kianni
(74) *Attorney, Agent, or Firm*—Gregg H. Rosenblatt

(57) ABSTRACT

A optical connector for terminating an optical fiber comprises a housing configured to mate with an LC receptacle. The housing comprises a polymer material that does not deform when exposed to temperatures of at least 210° C. The optical connector further includes a ferrule assembly. The ferrule assembly includes a ferrule portion and a barrel portion. The ferrule assembly is preloaded with a thermoplastic adhesive material. The thermoplastic material can be a polyamide-based hot melt adhesive. The thermoplastic mater can be an ultra high temperature hot melt adhesive. These optical connectors can be terminated in the field in a short amount of time.

20 Claims, 2 Drawing Sheets

SMALL FORM FACTOR OPTICAL CONNECTOR WITH THERMOPLASTIC ADHESIVE

BACKGROUND OF THE INVENTION

1. Field of the Invention

The present invention is directed to an optical connector.

2. Related Art

Mechanical optical fiber connectors for the telecommunications industry are known. In recent years, an emphasis has been placed on the use of small-form factor (SFF) optical fiber connectors. For example, LC ("Lucent Connectors") optical-type connectors have been described in U.S. Pat. Nos. 5,481,634; 5,719,977; and 6,318,903. These connectors are used for joining optical fiber segments at their ends and for connecting optical fiber cables to active and passive devices. The LC form factor is ~50% smaller than the form factors for other conventional optical connectors, such as ST, FC, and SC.

However, commercially available LC connectors are not well suited for field installations. Conventional adhesive materials include thermal, anaerobic or UV curing adhesives as well as the use of two-part epoxies and acrylates. For example, LC connectors typically use epoxy-based resins (e.g., two part epoxies) for fiber retention within the ferrule portion of the connector. These epoxies require about 10 to 15 minutes to heat cure after application. Once set, the fiber cannot be removed from the ferrule without breaking the fiber, thus making resetting of the optical fiber in the ferrule impractical.

SUMMARY OF THE INVENTION

According to a first aspect of the present invention, a optical connector for terminating an optical fiber comprises a housing configured to mate with an LC receptacle. The housing comprises a polymer material that does not deform when exposed to temperatures of at least 210° C. The optical connector further includes a ferrule assembly. The ferrule assembly includes a ferrule portion and a barrel portion. The ferrule assembly is preloaded with a thermoplastic adhesive material. The thermoplastic material can be a polyamide-based hot melt adhesive. The thermoplastic material can be an ultra high temperature hot melt adhesive.

According to another embodiment, an optical connector for terminating an optical fiber comprises a housing that includes a material that does not deform when exposed to temperatures of at least 210° C. The connector further includes a ferrule assembly having a ferrule portion and a barrel portion. The ferrule assembly is preloaded with an ultra high temperature hot melt adhesive.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
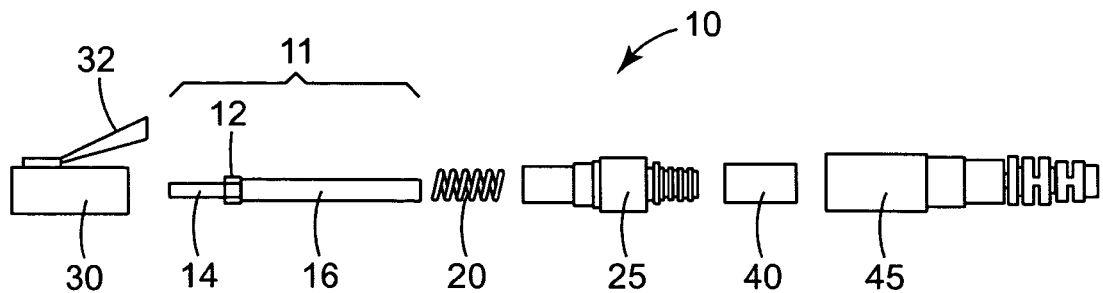
FIG. 1 shows an exploded view of an LC connector.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

The present invention is directed to a small-form factor optical connector adapted to use thermoplastic adhesives, more particularly ultra high temperature thermoplastic adhesives, for optical fiber retention, insertion, and termination.

According to an exemplary embodiment of the present invention, a small form factor, or LC-type, optical fiber connector includes a preloaded thermoplastic adhesive. The use of optical fiber connectors having thermoplastic adhesives provides a practical field termination capability. The thermoplastic adhesive utilized can be a thermoplastic resin, such as described in U.S. Pat. No. 4,984,865, incorporated by reference herein in its entirety. In addition, the thermoplastic adhesive can be an ultra high temperature (UHT) thermoplastic adhesive material which provides a high softening point and that is capable of satisfying environmentally stringent Telcordia GR-326 specifications. In one aspect, reduced assembly times in field termination applications can be accomplished. In an alternative embodiment, larger form factor fiber optic connectors can include a UHT thermoplastic adhesive material for more extreme environmental conditions.

FIG. 1 shows an LC-type optical fiber connector 10 in an exploded view. Connector 10 includes a housing 30 having a latching arm 32 and an axial or central bore to receive ferrule assembly 11. Housing 30 and latching arm 32 are formed or molded to be received into an LC receptacle.

According to an exemplary embodiment of the present invention, LC housing 30 is formed or molded from a high temperature material, such as a high temperature polymer (e.g., plastic) material. The high temperature polymer material is capable of withstanding temperatures of at least 190° C. In exemplary embodiments, the high temperature polymer material is capable of withstanding temperatures of at least 210° C., preferably in the range of 210° C. to about 270° C., without deformation of the body dimensions. Deformation can result in the interference with the matability of the connector to another connector or piece of equipment. For example, a high temperature material such as Ultem® XH 6050M, manufactured by General Electric, of New York, can be utilized.

Connector 10 further includes a ferrule assembly 11. The ferrule assembly can be designed to include a ferrule 14, a collar 12 and a barrel 16. Collar 12 can be used as a flange to provide resistance against spring 20, to maintain the position of the ferrule assembly within housing 30. Ferrule 14 can be formed from a ceramic, glass, plastic, or metal material to support an optical fiber inserted therein. The construction of barrel 16 is described in further detail below.

An optical fiber (not shown) can be inserted through the barrel 16, such that the fiber end slightly protrudes from or is coincident or coplanar with the end face of ferrule 14. As described in more detail below, according to an exemplary embodiment of the present invention, prior to termination of the optical fiber, a thermoplastic material, referred to herein as a "hot melt" adhesive or ultra high temperature (UHT) hot melt adhesive, can be loaded into the ferrule assembly for field termination and other applications. Once heated in the field, an operator can insert an optical fiber to a desired position. When heat is removed from the connector body, the fiber is quickly (about 2 minutes or less) set within the ferrule. Should repositioning of the fiber be required, the connector can be reheated, and the fiber can be reset within the ferrule.

Connector 10 can further include an insert or connector body 25 that provides for the retention of the ferrule assembly 11 and spring 20 within housing 30. Connector body 25 can slide over the ferrule assembly and can be secured in place by the outer connector housing 30. A crimp ring 40 provides additional axial retention and strain relief for the optical cable or optical fiber/jacket. A boot 45 can be further utilized to protect the optical fiber cable from bend related stress losses.

Figures 2A, 2B:
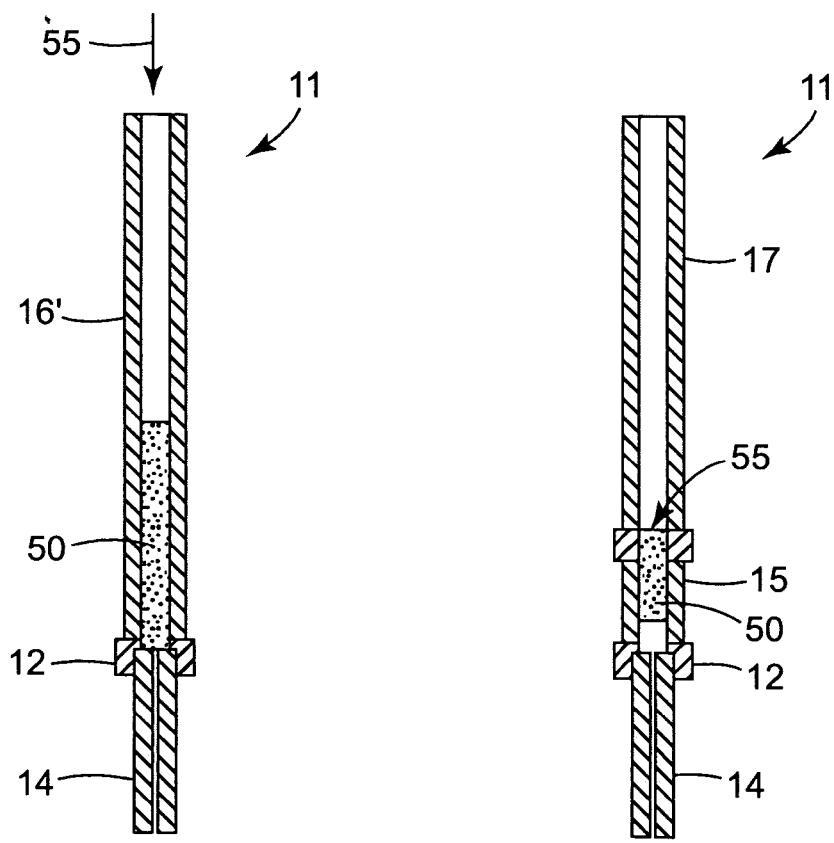
FIGS. 2A and 2B show alternative exemplary embodiments of pre-loaded ferrule-collar-barrel assemblies.

FIGS. 2A and 2B show alternative embodiments of ferrule assembly 11. In FIG. 2A, barrel 16' is elongated (e.g., having a length of about 0.25" to about 0.65"). The barrel 16' includes a preloaded amount of thermoplastic adhesive 50, which resides in both the barrel and ferrule 14. As discussed below, the thermoplastic adhesive is heated to a temperature sufficient to cause greater flow (e.g., liquefy). The thermoplastic adhesive can be inserted through barrel end 55 using an injection system. The elongated barrel 16' can be formed from a thermally conductive material, such as a metal or high temperature polymer. The elongated barrel 16' can aid in the manufacturing process and can withstand higher temperatures, as the ferrule assembly needs to be reheated in the field for fiber insertion, retention and termination. The barrel 16' can be a press fit assembly to the ferrule collar or a threaded assembly. Alternatively, barrel 16' and collar 12 can comprise an injection-molded, integral material. In a further alternative, a one-piece collar-barrel part can be machined from a suitable metal.

In FIG. 2B, the barrel comprises two main parts, shorter barrel portion 15 and extension 17. Barrel portion 15 can be formed from a thermally conductive material, such as a metal or high temperature polymer and is shorter in length than elongated barrel 16'. Extension 17 can be rigid or flexible. For example, a metal or high temperature polymer material, e.g., a fluoropolymer tube, can be press fit onto barrel portion 15. A preloaded amount of thermoplastic adhesive 50, which resides in both the barrel and ferrule, can be injected into barrel end 55.

Figure 3:
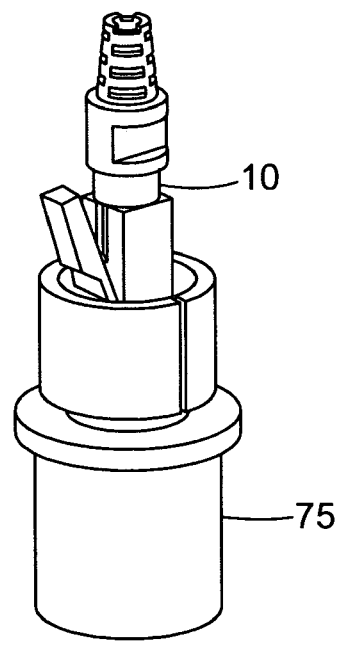
FIG. 3 shows a perspective view of an LC connector mounted in a load adapter prior to field termination of an optical fiber.

As described above, the LC-type, optical fiber connector includes a preloaded thermoplastic adhesive. Preloading involves the heating of a hot melt adhesive and an injection of a sufficient amount (e.g., volumes about 0.000157 cubic inches to about 0.00024 cubic inches, or greater) into the ferrule assembly. Typically, an amount of liquefied hot melt is injected so that a small amount or bead is exposed on the end face of the ferrule. The hot melt material is then cooled (e.g., by removing the ferrule assembly from heat), causing hardening. For fiber termination in the field, the LC fiber connector can be heated utilizing a load adapter, such as load adapter 75 shown in FIG. 3. Load adapter 75 is constructed from a material having a high thermal conductivity. In this exemplary embodiment, an LC fiber optic connector 10 is loaded with a sufficient amount of thermoplastic adhesive, such as a polyamide-based hot melt material or UHT hot melt material described herein. The load adapter 75 is then placed in a small oven configured to receive and support the load adapter. When the oven is heated, heat is transferred by the load adapter to the ferrule and barrel portion of the LC connector. Upon reaching a sufficient temperature, the hot melt adhesive softens or liquefies rapidly (e.g., in about 60 seconds) such that a stripped bare optical fiber can now be inserted through the barrel portion of the connector 10. The fiber is inserted to a distance where the fiber end face is coplanar or protrudes from the end face of the ferrule. When proper insertion is completed, heating is ceased, and the fiber is retained (becomes set) in the ferrule as the hot melt adhesive hardens. The fiber and ferrule are then polished to remove excess hot melt from the ferrule and fiber end face.

In an alternative embodiment, the existing hot melt material or UHT hot melt material described herein can be pre-loaded into other small form factor and multifiber connectors, such as an MU-type connector or an MT-type connector.

The thermoplastic adhesive materials of exemplary embodiments of the present invention will now be described.

For example, existing hot melt adhesives are described in U.S. Pat. No. 4,984,865. These hot melt materials can operate in temperature ranges from 0° to +60° C., commensurate with the TIA/EIA 568-B.3 Optical Fiber Cabling Components Standard for environments such as inside buildings (Campus or Premise). Due to the nature of some of these polyamide-based chemistries, at temperatures above 65° C., pistoning of the fiber in the connector may occur as the adhesive softens.

According to further exemplary embodiments of the present invention, higher temperature thermoplastic adhesives, referred to herein as UHT hot melt materials or UHT hot melt adhesives, may be utilized. For wider temperature operating environments such as Central office and Outside Plant, adhesives must have an operating range of −40° to +85° C. to meet the Telcordia GR-326 CORE and GR-1435-CORE Standards. Traditionally, it was believed that adhesives needed to have a glass transition temperature ("Tg") that was higher than the upper limit of the operating temperature range (i.e. epoxy adhesives). Further, it has been generally held and empirically proven that having the Tg in the middle of the operating temperature range could result in inconsistent optical performance due to nonlinear changes in the physical properties of the adhesive at temperatures above the Tg, such as the coefficient of thermal expansion and flow behavior of the adhesive, leading to fiber pistoning. However, exemplary samples tested below should not exhibit such pistoning because of their creep-resistance properties.

Figure 4:
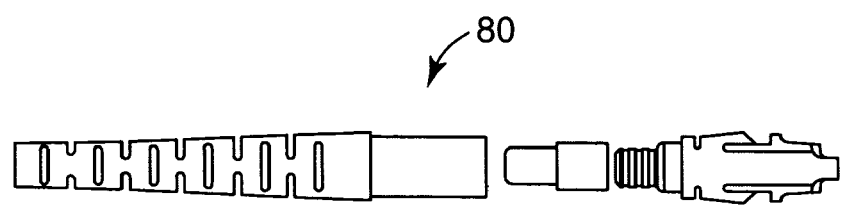
FIG. 4 shows a conventional SC connector.
Figure 5:
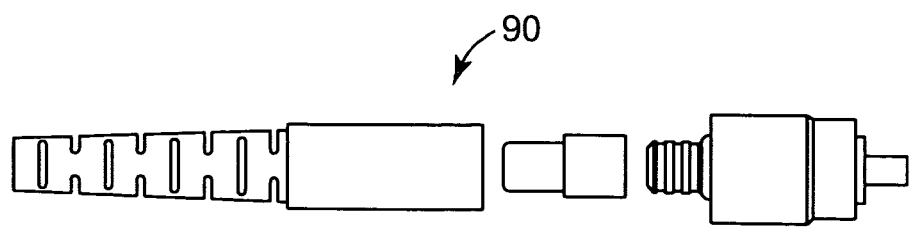
FIG. 5 shows a conventional FC connector.

Exemplary embodiments of the present invention provide the use of UHT hot melt fiber optic connectors in an increased number of applications due to enhanced thermal and humidity resistance. These properties allow for installers in outside plant applications to make fiber optic connections quickly and in a straightforward manner. The UHT materials can be utilized in an LC connector, such as is shown in FIG. 1. According to an alternative embodiment, the UHT materials can be pre-loaded in larger form factor connectors, such as SC connector 80 and FC connector 90 (shown in FIGS. 4 and 5, respectively), and ST connectors.

UHT hot melt materials can include polyamides, and polyesters which can have semi-crystalline properties. For example, UHT hot melt adhesives may be selected from materials such as Macromelt® polyamide resins (TPX-12-

692, 6300, TPX-16-346 or TPX-16-192 available from Henkel), other similar polyamides (PA) available from Loctite or Hysol, polyetherimides or polyesters including polyetheylene terephthalate (PET), polybutylene terephthalate (PBT), or copolymers thereof (Dynapol S394 (PET) and Dynapol S361, Dynapol S341 or Dynapol S341HV (PBT) available from Creanova or Vitel 4255 (PBT) available from Bostik). The physical characteristics of several different types of UHT hot melt adhesives are shown below in Table 1. A comparison hot melt material, similar to that described in U.S. Pat. No. 4,984,865 is also listed.

fiber protrusion requirements can be relaxed, making the polishing process more robust. As an example, a target fiber protrusion range for lower softening point hot melt adhesives is about 0.5 μm to 1.5 μm, which ensures sufficient optical contact. This protrusion range can limit the amount of polishing performed in the field. Over polishing can occur once the existing hot melt bead is removed from the connector end face.

UHT hot melt materials provide for straightforward polishing. For example, with exemplary UHT hot melt materials, the target fiber protrusion range can be similar to that

TABLE 1

| | Crystallinity | | | Softening Point | Creep Resistance | Tg | Shore D | Water Absorption | | Viscosity | Modulus G' at 85 C. |
|---|---|---|---|---|---|---|---|---|---|---|---|
| | | (%) | Polymer | (° C.) | (° C.) | (° C.) | Hardness | 2-day | 7-day | (P) | (Pa) |
| TPX-12-692 | Some | | PA | 206–216 | 178–184 | −14 | 73/62 | 0.2%+ | 0.4% | 25–60 at 240° C. | |
| Macromelt 6300 | Some | | PA | 190–200 | 185–190 | −23 | 62 | 0.1%+ | 0.3% | 25–50 at 240° C. | 1.1E+07 |
| TPX-16-346 | Some | | PA | 185–195 | 165–175 | −20 | 70–74 | 0.2%+ | 0.5% | 25–50 at 210° C. | |
| TPX-16-192 | Some | | PA | 167–170 | 167–162 | −17 | 68–70 | 0.3%+ | 0.6% | 35–50 at 210° C. | |
| Dynapol S 394 | High | 28 | PET | 182–189 | | −16 | 50 | 0.9% | 0.9% | 100 at 200° C. | 1.1E+07 |
| Dynapol S 341 HV | Med. | 22 | PBT | 150–155 | | −28 | 56 | 0.7% | 0.6% | | 4.3E+07 |
| Vitel copolyester 4255 | Med. | 22 | PBT | 156 | | −8 | 53 | 0.3% | 0.3% | 750 at 215° C. | 1.1E+07 |
| Current Hot Melt Adhesive | None | | PA | 170–190 | | 65 | 61 | 0.6% | 0.9% | 20 at 190° C. | 7.0E+06 |

+water absorption after 1 day

As shown, these exemplary UHT hot melt materials are not limited to polyamide materials. These UHT hot melt materials can also have one or more of the following properties:

a) a melt viscosity of 1000–20,000 cp in the working temperature range (210–250° C.);

b) a Shore D hardness of 50–85 at room temperature;

c) 15–35% crystallinity in the adhesive to provide superior adhesive stability in fiber optic connectors;

d) a Young's Modulus greater than about $1 \times 10^7$ psi within the operational temperature of the connector; and e) enhanced polishing characteristics resulting in less smearing of the adhesive and more precise control of the fiber-to-ferrule profile.

The Shore D hardness property described above represents a substantial increase in Shore D hardness range compared to some polyamide-based hot melt materials, which have Shore D hardness values of greater than 60. For example, some exemplary UHT hot melt material described herein have a Shore D hardness of about 50 to about 57. In addition, UHT hot melt adhesives of the exemplary embodiments can be utilized in a wide operational temperature range, enabling a broad range of uses.

According to one embodiment, an exemplary UHT hot melt adhesive can be semi-crystalline in structure, having a Tg within the standard operating window. In addition to having suitable thermal performance, the UHT hot melt adhesives of exemplary embodiments can possess enhanced polishing characteristics over other hot melt adhesives.

In addition, the exemplary UHT hot melt adhesives exhibit extremely low creep resistance levels. As a result, commonly utilized for epoxy-based fiber connectors: +50 nm to −125 nm, as is described in Telcordia GR-326 (& IEC Connector Specs). This protrusion range is considered virtually 'coplanar' (−125 nm is a slight undercut), with the radius of curvature that results on the ceramic ferrule end face. As a result, the ceramic ferrule end face can act as a polish stop. With a suitable final polishing media, such as a 20 nm $SiO_2$ lapping film (or fine Aluminum oxide lapping film), many extra polishing strokes can be made to remove scratches, without exceeding the maximum fiber undercut specification of 125 nm. In addition, the UHT hot melt materials (when set) provide a sufficiently hard material that can be rapidly removed when polishing, without spalling or peeling away.

Thus, by utilizing a UHT hot melt material in a small form factor fiber optic connector, the combination of straightforward polishing and rapid removal rate of the UHT hot melt materials (as compared with conventional epoxies) provides an advance over the current state of the art with respect to field mount polishing. Presently, small form factor ceramic-ferruled connectors such as LC or MU are supplied with small flat end faces (e.g., ~0.7 to 0.9 mm) that are perpendicular to the axis of the ferrule, with no radius. Through polishing with a succession of lapping films from coarse to fine, which is required to remove the epoxy-type (i.e., hard) adhesives, a radius is formed and subsequently the fiber is polished-out to a fine surface finish. When polishing to meet the specifications described in Telcordia GR-326 (& IEC Connector Specs.), the required Apex Offset (50 μm max.) can be difficult to control by hand using a conventional 1.5" diameter field polishing jig. Additionally, the radius of curvature of the polished fiber end can become less than 7 mm (the min. radius requirement in GR-326 & IEC Connector Specs.) because the conventional ferrule extension through the polishing jig is excessive, which leads to radii as small as 3 mm and Apex Offsets as high as 80 µm.

Other polishing techniques can be utilized with UHT hot melt fiber optic connectors. For example, UHT hot melt material can be removed in a one-step 2 µm $Al_2O_3$ Multimode process or a two-step SM Process, utilizing 20 nm $SiO_2$ as the second step. Thus, the ceramic ferrule can be factory pre-radiused to a desired target range of approximately 8–15 mm with an Apex Offset of 30 µm maximum. A precise polishing jig that controls the ferrule extension through the bottom of the jig can be utilized—thus, the radius of curvature can be maintained along with the Apex Offset in a field polishing process.

EXAMPLES AND TESTS

In a first performance test, sample UHT holt melt adhesives (in this test, Dynapol materials) were prepared. To test the performance of the Dynapol hot melt adhesives in its operating environment, fiber optic cables were prepared as follows: several lengths of Siecor 62.5 multimode fiber cable (6 m in length) were prepared by removing 1.25 inches of the jacketing material to expose the "Kevlar" fibers. The Kevlar fibers were separated to expose the buffer coated optical fiber. About 1.125 inches of the buffer coating was stripped from the optical fiber to expose the bare glass fiber. The fiber was wiped with isopropyl alcohol to clean the exposed glass. The Kevlar fibers were then trimmed to a length of 0.25 inches and redistributed evenly around the buffer.

An adhesive filled ST connector was placed into an oven (available from Kitco, in Virginia) and heated to about 265° C. until molten. The bare optical fiber was then inserted through the axial bore in the ceramic ferrule to a position where the fiber end face protruded past the ferrule end face, and the Kevlar Fibers and jacketing material entered the body portion of the connector and contacted the adhesive. It is noted that the bead of hot melt adhesive on the ferrule end face provides lateral support for the fiber during the cleaving process. The cleaved fiber was then polished with a 2 µm aluminum oxide lapping film (available from 3M Company, # 60-6500-2346-2) to a specified length. Polishing can be performed to generate a fiber end face that is coplanar with the ferrule and face. Alternatively, polishing can be performed to create a fiber protrusion up to about 1.5 µm. An interferometer (available from Direct Optical Research Corporation—DORC ZX-1 Mini PMS) can be used to measure the fiber protrusion after polishing.

These exemplary UHT hot melt adhesive materials can provide favorable polishing in part because localized heating of the UHT hot melt adhesive material during polishing does not exceed the softening point of the materials.

In a first polishing test, a coplanar polish was performed using an SC connector preloaded with an exemplary UHT hot melt material. Table 2 shows performance test results for coplanar polished thermoplastic adhesive materials (No. Passed/No. Tested):

TABLE 2

| Material | Temperature Cycle | | Humidity | | Heat Step |
|---|---|---|---|---|---|
| | −10° C.–+60° C. | −40° C.–+80° C. | 40° C./95% RH 4 days | 75° C./95% RH 4 days | 60° C.–120° C. |
| Dynapol S394 | 5/5 | 5/5 | 5/5 | 5/5 | 4/5 |
| Dynapol S361 | 5/5 | 5/5 | 5/5 | 5/5 | 5/5 |

These samples underwent the following test regime: −10° C.–+60° C. temperature cycle, 4 days at 95% RH 40° C., −10° C. –+60° C. temperature cycle, 4 days at 95% RH 75° C., −40° C. –+80° C. temperature cycle and finally a 60° C.–120° C. heat test. The environmental test of Table 2 was performed consecutively on the same set of connectors. As Table 2 indicates, all temperature cycling and humidity samples passed the tests, which are a combination of TIA/EIA 568-B.3, Telcordia GR-326, and even exceeding GR-326 by testing to a temperature of 120° C.

In a second polishing test, a standard LC polishing jig that normally allows the ferrule to protrude 0.8 mm was modified so that the ferrule would only protrude 0.3 mm. Polishing was accomplished by using a 70 Dur. (Shore A) elastomeric polishing pad beneath the lapping film. The radius on the test samples was held to about 7.5 to 11 mm, with Apex Offsets ranging from 10–35 µm. The radius can be further adjusted by using a slightly higher Durometer Pad or by changing the ferrule extension from the jig base.

In another performance test, sample UHT holt melt adhesives (in this test, Henkel materials) were prepared. To test the performance of the Henkel 12–692 adhesive, 15 connectorized pairs of SM SC/UPC connectors were submitted to complete Telcordia GR-326 environmental tests. All SM SC/UPC connectors were preloaded with UHT hot melt as described above and all optical fibers were terminated in the manner described above. All test samples passed the optical requirements of <0.3 dB change in Loss and >55 dB reflection.

In another performance test, sample UHT holt melt adhesives were utilized in a test of 7 connectorized pairs of LC Connectors. These connectors were preloaded with exemplary UHT hot melt adhesives (in this test, Henkel materials) and terminated in the manner described above. All of the test samples passed Telcordia GR-326 Engineering (screening) tests, which had the same temperature limits, but shorter test durations to accelerate feedback.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An optical connector for terminating an optical fiber, comprising:

a housing configured to mate with an LC receptacle, said housing comprising a polymer material that does not deform when exposed to temperatures of at least 210° C.; and a ferrule assembly, said ferrule assembly including a ferrule portion and a barrel portion, said ferrule assembly preloaded with a thermoplastic adhesive material.

2. The optical connector of claim 1, wherein the thermoplastic material is a polyamide-based hot melt adhesive.

3. The optical connector of claim 1, wherein the thermoplastic material is an ultra high temperature hot melt adhesive.

4. The optical connector of claim 3, wherein the ultra high temperature hot melt material has a melt viscosity of 1000–20,000 cp in a temperature range of about 200° C. to about 250° C.

5. The optical connector of claim 3, wherein the ultra high temperature hot melt material has a Shore D hardness of about 50 to about 85 at room temperature.

6. The optical connector of claim 3, wherein the ultra high temperature hot melt material has a Shore D hardness of about 50 to about 57.

7. The optical connector of claim 3, wherein the ultra high temperature hot melt material comprises a semi-crystalline material having from about 15% to about 35% crystallinity.

8. The optical connector of claim 3, wherein the ultra high temperature hot melt material has a Young's Modulus greater than about $1 \times 10^7$ psi within an operational temperature of about −40° C. to about 85° C.

9. The optical connector of claim 1, wherein the polymer material does not deform when exposed to temperatures of about 210° C. to about 270° C.

10. The optical connector of claim 1, further comprising an optical fiber terminated in the ferrule by said thermoplastic adhesive, wherein the terminated connector has an operational temperature range of about −40° C. to about +85° C.

11. The connector of claim 1, wherein the barrel portion comprises an elongated heat conductive tube.

12. The optical connector of claim 1, further comprising an optical fiber terminated in the ferrule by said thermoplastic adhesive, wherein the optical fiber is resettable in the ferrule assembly by the application of heat, then the removal of heat.

13. The connector of claim 12, wherein the ultra high temperature hot melt material comprises a semi-crystalline material having a 15% to about 35% crystallinity.

14. The connector of claim 12, wherein the housing comprises a polymer material and the housing is configured to mate with an LC receptacle.

15. The connector of claim 12, wherein the connector comprises one of an SC-type connector, a FC-type connector, an MT-type connector, an MU-type connector, and an ST-type connector.

16. An optical connector for terminating an optical fiber, comprising:

a housing comprising a material that does not deform when exposed to temperatures of at least 210° C.; and a ferrule assembly, said ferrule assembly including a ferrule portion and a barrel portion, said ferrule assembly preloaded with a thermoplastic adhesive material, wherein the thermoplastic material is an ultra high temperature hot melt adhesive.

17. The connector of claim 16, wherein the ultra high temperature hot melt material has a melt viscosity of 1000–20,000 cp in a temperature range of about 200° C. to about 250° C.

18. The connector of claim 16, wherein the ultra high temperature hot melt material has a Shore D hardness of about 50 to about 85 at room temperature.

19. An optical connector for terminating an optical fiber, comprising:

a housing configured to mate with an MU-type receptacle, said housing comprising a polymer material that does not deform when exposed to temperatures of at least 210° C.; and a ferrule assembly, said ferrule assembly including a ferrule portion and a barrel portion, said ferrule assembly preloaded with a thermoplastic adhesive material.

20. An optical connector for terminating an optical fiber, comprising:

a housing configured to mate with an MT-type receptacle, said housing comprising a polymer material that does not deform when exposed to temperatures of at least 210° C.; and a ferrule assembly, said ferrule assembly including a ferrule portion and a barrel portion, said ferrule assembly preloaded with a thermoplastic adhesive material.

* * * * *

UNITED STATES PATENT AND TRADEMARK OFFICE
CERTIFICATE OF CORRECTION

| | |
|---|---|
| PATENT NO. | : 7,147,384 B2 |
| APPLICATION NO. | : 10/811437 |
| DATED | : December 12, 2006 |
| INVENTOR(S) | : David S. Hardcastle |

It is certified that error appears in the above-identified patent and that said Letters Patent is hereby corrected as shown below:

<u>Column 6,</u>
Table 1, delete column heading "Water Absortion" and insert in place thereof -- Water Absorption --.

<u>Column 8,</u>
Line 22, after "heat" insert -- step --.

<u>Column 9,</u>
Line 7, after "material" insert -- comprising a semi-crystalline material --.
Lines 24-25, delete "a semi-crystalline material having".

<u>Column 10,</u>
Line 15, after "material" insert -- comprising a semi-crystalline material --.
Line 45, after "material" insert -- comprising a semi-crystalline material --.

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,147,384 B2 | Page 1 of 1 |
| APPLICATION NO. | : 10/811437 | |
| DATED | : December 12, 2006 | |
| INVENTOR(S) | : David S. Hardcastle | |

It is certified that error appears in the above-identified patent and that said Letters Patent is hereby corrected as shown below:

<u>Column 5</u>,
Line 46, delete "psi" and insert in place thereof -- Pa --.

<u>Column 9</u>,
Line 28, delete "psi" and insert in place thereof -- Pa --.

Signed and Sealed this

Twenty-second Day of July, 2008

JON W. DUDAS
*Director of the United States Patent and Trademark Office*